United States Patent
Wörner et al.

(10) Patent No.: US 9,015,622 B2
(45) Date of Patent: Apr. 21, 2015

(54) PROFILE-BASED PERFORMANCE TUNING OF COMPUTING SYSTEMS

(75) Inventors: Thomas K. Wörner, Tübingen (DE); Christopher Haughey Snook, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 859 days.

(21) Appl. No.: 12/690,755

(22) Filed: Jan. 20, 2010

(65) Prior Publication Data
US 2011/0179384 A1    Jul. 21, 2011

(51) Int. Cl.
| | | |
|---|---|---|
| G06F 3/048 | (2013.01) |
| G06F 1/24 | (2006.01) |
| G06F 9/00 | (2006.01) |
| G06F 9/24 | (2006.01) |
| G06F 9/30 | (2006.01) |
| G06F 9/40 | (2006.01) |
| G06F 15/00 | (2006.01) |
| G06F 15/177 | (2006.01) |
| G01R 27/28 | (2006.01) |
| G01R 31/00 | (2006.01) |
| G01R 31/14 | (2006.01) |
| G06F 9/445 | (2006.01) |

(52) U.S. Cl.
CPC .................................. G06F 9/44505 (2013.01)

(58) Field of Classification Search
USPC ........... 702/119, 123; 712/200–203; 713/1, 2, 713/100; 715/810
See application file for complete search history.

(56) References Cited

U.S. PATENT DOCUMENTS

| | | | |
|---|---|---|---|
| 6,112,301 A * | 8/2000 | Johnson ............................. 713/1 |
| 6,178,503 B1 * | 1/2001 | Madden et al. .................... 713/2 |
| 6,460,136 B1 * | 10/2002 | Krohmer et al. ................... 713/2 |
| 6,490,677 B1 * | 12/2002 | Aguilar et al. ..................... 713/1 |
| 6,671,802 B1 * | 12/2003 | Ott ................................ 713/100 |
| 6,727,920 B1 * | 4/2004 | Vineyard et al. ............... 715/810 |
| 6,981,135 B1 * | 12/2005 | Trask ................................ 713/1 |
| 7,167,974 B2 * | 1/2007 | Roth et al. ........................ 713/1 |
| 7,191,322 B2 * | 3/2007 | Millward et al. ................. 713/1 |
| 7,260,712 B2 * | 8/2007 | Chandramouleeswaran et al. ................................ 713/1 |
| 7,302,561 B2 * | 11/2007 | Chandramouleeswaran et al. ............................. 713/100 |
| 7,392,374 B2 * | 6/2008 | Chandramouleeswaran et al. ............................. 713/100 |
| 7,480,793 B1 * | 1/2009 | Marsh ............................... 713/2 |
| 2002/0157001 A1 * | 10/2002 | Huang et al. ...................... 713/2 |

(Continued)

OTHER PUBLICATIONS

Kroah-Hartman, Greg, "Linux Kernel in a Nutshell," O'Reilly Media, Inc., Dec. 14, 2006.*

(Continued)

*Primary Examiner* — Eric J Bycer
(74) *Attorney, Agent, or Firm* — Lowenstein Sandler LLP

(57) ABSTRACT

Some embodiments of a system and a method to tune a computing system based on a profile have been presented. A profile as used herein broadly refers to a file containing various parameters of a computing system, such as kernel parameters (e.g., buffer size, network setup, etc.), usable to configure the computing system. For instance, a set of profiles are stored in a computer-readable storage device in a computing system, such as a server, a personal computer, a laptop computer, etc. A processing device miming on the computing system may receive a user selection of one of the set of profiles. In response to the user selection, the processing device may load the selected profile onto the computing system in order to tune the computing system according to the selected profile.

16 Claims, 3 Drawing Sheets

(56) References Cited

U.S. PATENT DOCUMENTS

| | | | |
|---|---|---|---|
| 2003/0023707 A1* | 1/2003 | Ryan | 709/220 |
| 2003/0023764 A1* | 1/2003 | Reese et al. | 709/250 |
| 2003/0074551 A1* | 4/2003 | Chandramouleeswaran et al. | 713/100 |
| 2003/0093658 A1* | 5/2003 | Wen et al. | 713/1 |
| 2004/0194022 A1* | 9/2004 | Cleraux et al. | 715/513 |
| 2005/0268092 A1* | 12/2005 | Shankar et al. | 713/164 |
| 2006/0010446 A1* | 1/2006 | Desai et al. | 718/100 |
| 2006/0053272 A1* | 3/2006 | Roth et al. | 713/1 |
| 2006/0069909 A1* | 3/2006 | Roth et al. | 713/100 |
| 2006/0294358 A1* | 12/2006 | Wang | 713/2 |
| 2008/0263183 A1* | 10/2008 | Nishiyama et al. | 709/220 |
| 2009/0037722 A1* | 2/2009 | Chong et al. | 713/2 |
| 2009/0089569 A1* | 4/2009 | Baribault et al. | 713/2 |
| 2009/0327689 A1* | 12/2009 | Lazar | 713/100 |
| 2011/0055537 A1* | 3/2011 | Yang | 713/2 |
| 2011/0078429 A1* | 3/2011 | Yang et al. | 713/2 |

OTHER PUBLICATIONS

"How to change settings for the bootloader and splash screen in Ubuntu," Jun. 7, 2008, retrieved on Jun. 23, 2012 from http://www.ubuntugeek.com/how-to-change-settings-for-the-bootloader-and-splash-screen-in-ubuntu.html#more-526.*

"Grub bootloader—Full tutorial," www.dedoimedo.com/computers/grub.html archived on Dec. 20, 2008, retrieved from the Internet Archive (www.archive.org) on May 22, 2014. (14 pages).*

"Grub 2 bootloader—Full tutorial," www.dedoimedo.com/computers/grub-2.html archived on Dec. 7, 2008, retrieved from the Internet Archive (www.archive.org) on May 22, 2014. (32 pages).*

\* cited by examiner

PROFILE-BASED PERFORMANCE TUNING OF COMPUTING SYSTEMS

TECHNICAL FIELD

Embodiments of the present invention relate to tuning computing systems, and more specifically, to profile-based performance tuning of computing systems.

BACKGROUND

Currently, many conventional computing systems are setup during initialization according to a single profile pre-installed into the computing systems. The profile typically contains a set of parameters of the computing system, which are values determined previously to work for all purposes in general. Although users desiring a different setup may manually adjust or modify one or more parameters after the computing system is initialized, such a manual process is tedious and error-prone. Moreover, users may have to repeat this manual adjustment every time the computing system is re-initialized because the previously set values may have been lost due to re-initialization of the computing system.

BRIEF DESCRIPTION OF THE DRAWINGS

The present invention is illustrated by way of example, and not by way of limitation, in the figures of the accompanying drawings and in which.

DETAILED DESCRIPTION

Figure 1:
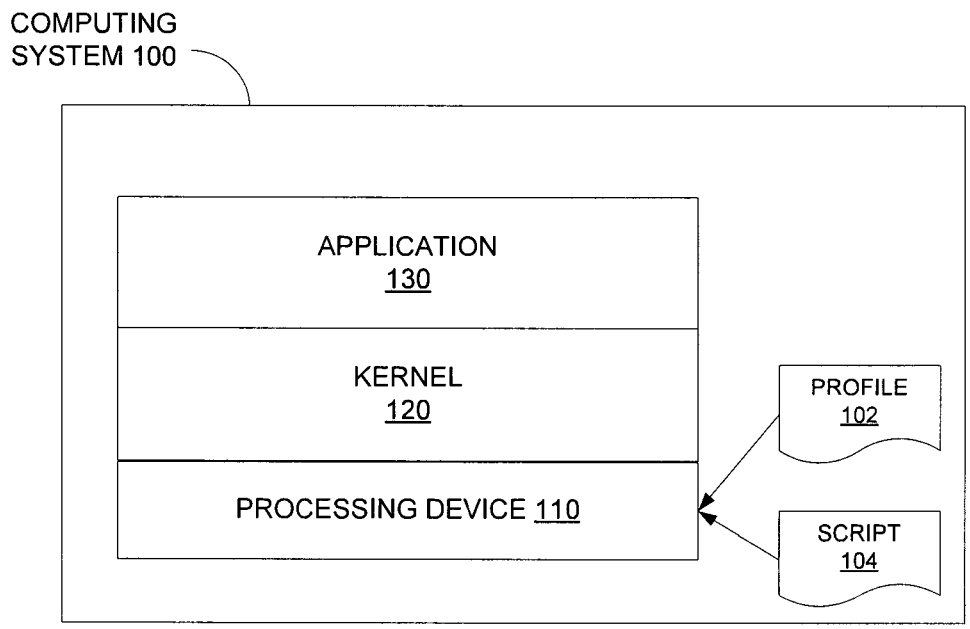
FIG. 1 illustrates one embodiment of software architecture executable in a computing system.

Described herein are some embodiments of a method, an apparatus, and a system to tune a computing system based on a profile. A computing system as used herein generally refers to a system usable to execute instructions, where the system may include a combination of software, hardware, and/or firmware. Some examples of a computing system include a server, a personal computer, a laptop computer, etc. A profile as used herein broadly refers to a file containing various parameters of a computing system, such as kernel parameters (e.g., buffer size, network setup, etc.), usable to configure the computing system. In one embodiment, a set of profiles are stored in a computer-readable storage device (such as a hard drive) in a computing system. A processing device (such as a central processing unit (CPU)) running on the computing system may receive a user selection of one of the set of profiles. In response to the user selection, the processing device may load the selected profile onto the computing system in order to tune the computing system according to the selected profile. More details of some embodiments of profile-based performance tuning of computer systems are described below.

By allowing users to select a profile from a set of profiles, the users can tune the computing system according to the users' or their applications' needs and/or objectives. For instance, in one situation, power reduction may be of higher priority to a user over other considerations, and hence, the user may select a profile geared towards reducing power consumption by the computing system. In another example, increasing throughput may be of higher priority to the user over other considerations, and hence, the user may select another profile customized to increase throughput. As a result, the overall performance of the computing system can improve in the particular aspect that is important to the user.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "storing" or "receiving" or "loading" or "executing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Figure 4:
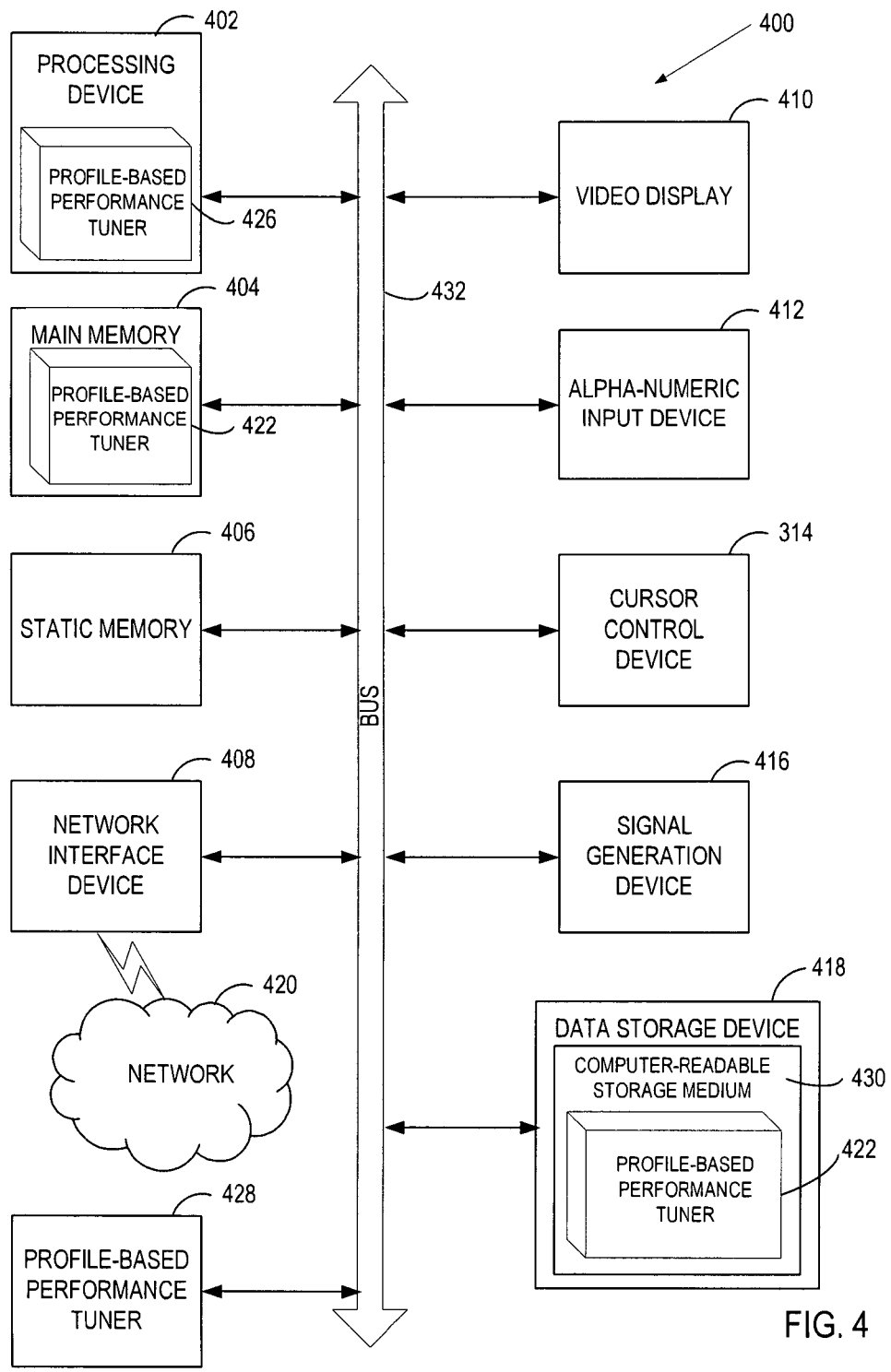
FIG. 4 illustrates a block diagram of an exemplary computer system.

FIG. 1 illustrates one embodiment of software architecture executable in a computing system. The computing system 100 includes a processing device 110. The computing system 100 may be implemented using a server, a PC, a laptop computer, etc. In addition to the processing device 110, the computing system 100 may include other components (such as a hard drive, a network interface, a display device, user input devices, etc.). Details of one embodiment of the computing system 100 are illustrated in FIG. 4. Various modules of the software architecture may be executed by the processing device 110.

In some embodiments, the software architecture executable on the processing device 110 includes a kernel 120 and an application 130. Note that there may be multiple applications and/or other software modules running on the processing device 110 via the kernel 120 in some embodiments. Before executing the application 130, the kernel 120 is tuned based on a user-selected profile to provide the desired performance. In one embodiment, some parameters of the kernel 120 is setup according to the user-selected profile. Some embodiments of profile-based performance tuning are discussed further in details below.

In some embodiments, multiple profiles are stored in the computing system 100. As discussed above, a profile is a file containing various parameters of the computing system 100, such as kernel parameters (e.g., buffer size, network setup, memory usage policy, etc.), usable to configure the computing system 100. The parameters are set for tuning the computing system 100. In particular, the parameters include kernel parameters, whose values are chosen to achieve the desired performance of the kernel 120 running on the processing device 110 in some embodiments. In some embodiments, the profiles are initially built based on experimental results from benchmarks simulating a target application profile and/or fail-safe limits, to prevent the optimization from causing severe degradation on non-target workloads. The profiles may be further tuned after the initial built. For instance, the profiles may be hand-tuned or tuned using genetic algorithms. To load a particular profile, the processing device 110 may set the kernel 120 according to these kernel parameters in the particular profile. Alternatively, each of the profiles may be associated with a distinct script executable by the processing device 110 to load the respective profile in the computing system 100. The processing device 110 may execute a script (such as script 104) associated with a particular profile (such as profile 102) in order to set the kernel 120 according to the parameters in the particular profile.

In some embodiments, each of the profiles may be written for a specific purpose. For example, one of the profiles may be written to improve throughput of the computing system 100. A second one of the profiles may be written to reduce latency of the computing system 100. A third one of the profiles may be written to reduce power consumption by the computing system 100. A fourth one of the profiles may be tailored to the needs of a certain application (such as application 130). Thus, the fourth one may be referred to as an application-specific profile as well. In addition, different profiles may be written for different types of computing systems. For example, one profile may be written for 32-bit computing systems, while another profile may be written for 64-bit computing systems. These profiles may, therefore, be referred to as machine-specific profiles.

To allow the user to select a profile, the processing device 110 may generate a user interface. Some examples of the user interface include a command line interface (CLI), a graphical user interface (GUI), an editor, etc. One embodiment of a GUI is illustrated in FIG. 2 to explain the concept.

Note that some or all of the profiles may be written by a system administrator and/or a user of the computing system 100 and be input to the computing system 100 via a user interface. For example, in addition to the GUI that allows users to select one of the existing profiles, the processing device 110 may generate another GUI to allow users to input a user-written custom profile not yet available on the computing system 100. Alternatively, some or all of the profiles may be previously stored onto the computing system 100 by an original equipment manufacturer (OEM) before the computing system 100 is shipped to users.

After loading the user-selected profile, the kernel 120 is setup and ready to execute the application 130. Because the kernel 120 has been tuned based on a profile selected for a particular purpose, the kernel 120 may execute the application 130 in a way that better meets the user's objective. As a result, the overall performance of the computing system 100 may be better tuned according to the need and/or expectation of the user.

Figure 2:
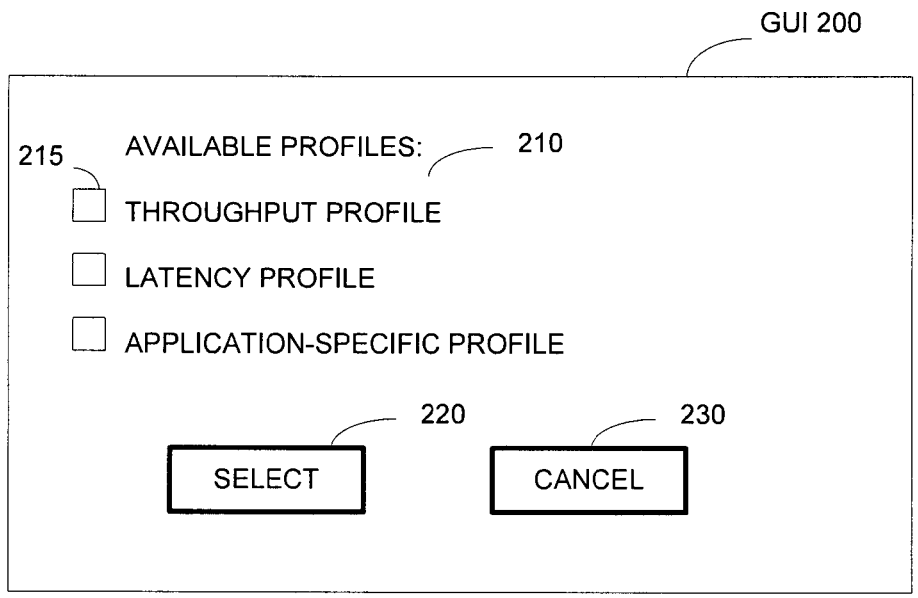
FIG. 2 illustrates one embodiment of a graphical user interface.

FIG. 2 illustrates one embodiment of a GUI for profile selection in a computing system. The GUI 200 in FIG. 2 is usable by a user to select a particular profile of interest from a set of available profiles stored in a computer-readable storage device in the computing system. The GUI 200 displays a list of available profiles 210 along with checkboxes 215 next to them. Although there are only three (3) available profiles 210 (namely, throughput profile, latency profile, and application-specific profile), one should appreciate that other embodiments may provide more or fewer profiles, or a different combination of profiles.

In one embodiment, a user may select a particular profile from the list of profiles 210 by actuating a user input device to check the corresponding checkbox of the particular profile, and then actuating the "SELECT" button 220. The GUI 200 may be used to select a profile when initializing the computing system, or to switch to a different profile after initialization of the computing system. If a user wants to cancel the profile selection and terminate the GUI 200, the user may actuate the "CANCEL" button 230.

Note that the GUI 200 is merely one embodiment of the user interface usable to select a particular profile. Other user interfaces of different types (e.g., CLI, editor, etc.) or GUIs having different look and arrangement of user interface control may be used in different embodiments of the invention to allow user selection of profiles available on the computing system.

Figure 3:
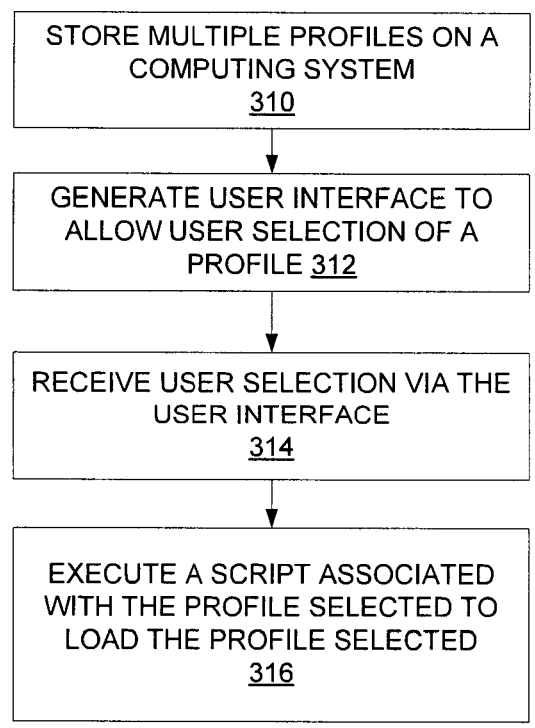
FIG. 3 illustrates a flow diagram of one embodiment of a method to tune the performance of a computing system based on a profile.

FIG. 3 illustrates a flow diagram of one embodiment of a method to tune the performance of a computing system based on a profile. The method may be performed by processing logic that may comprise hardware (e.g., circuitry, dedicated logic, programmable logic, microcode, etc.), software (such as instructions that run on a processing device), firmware, or a combination thereof. For instance, the computing system 400 illustrated in FIG. 4 may perform at least part of the method in some embodiments.

Initially, processing logic stores a set of profiles on a computing system (processing block 310). For example, the computing system may include a server and the profiles may be stored in a hard drive of the server. Then processing logic generates a user interface to allow a user to select one of the profiles (processing block 312). The user interface may include a CLI, a GUI, an editor, etc. One embodiment of a GUI that allows the user to make a profile selection is shown in details in FIG. 2. Alternatively, processing logic may generate a user interface to allow the user to input a profile instead of selecting one of the existing profiles on the computing system. For instance, the user may provide a custom profile stored on a removable computer-readable storage medium (e.g., a compact disk, a flash drive, etc.) and instruct processing logic to retrieve the custom profile from the removable computer-readable storage medium via the user interface. In another example, the user may instruct processing logic to retrieve the custom profile from another computing system communicatively coupled to the computing system via a network (e.g., a local area network (LAN), a wide area network (WAN), etc.).

In some embodiments, processing logic receives the user selection via the user interface (processing block 314). In response to the user selection, processing logic executes a script associated with the profile selected to load the profile selected onto the computing system (processing block 316). As discussed above, the profile includes a set of kernel parameters, such as buffer size, memory usage policy, network setup, etc. To load the profile, processing logic may set up the kernel running on a processing device within the computing system according to the kernel parameters.

FIG. 4 illustrates a diagrammatic representation of a machine in the exemplary form of a computer system 400 within which a set of instructions, for causing the machine to perform any one or more of the methodologies discussed herein, may be executed. In alternate embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 432.

Processing device 402 represents one or more general-purpose processing devices such as a microprocessing device, a central processing unit, or the like. More particularly, the processing device may be complex instruction set computing (CISC) microprocessing device, reduced instruction set computing (RISC) microprocessing device, very long instruction word (VLIW) microprocessing device, or processing device implementing other instruction sets, or processing devices implementing a combination of instruction sets. Processing device 402 may also be one or more special-purpose processing devices such as an application specific integrated circuit (ASIC), a field programmable gate array (FPGA), a digital signal processing device (DSP), network processing device, or the like. The processing device 402 is configured to execute functions or APIs in the profile-based performance tuner 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., profile-based performance tuner 422) embodying any one or more of the methodologies or functions described herein. The profile-based performance tuner 422 may also reside, completely or at least partially, within the main memory 404 and/or within the processing device 402 during execution thereof by the computer system 400, the main memory 404 and the processing device 402 also constituting computer-accessible storage media. The profile-based performance tuner 422 may further be transmitted or received over a network 420 via the network interface device 408.

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

The profile-based performance tuner 428, components and other features described herein (for example, in relation to FIG. 3) can be implemented as discrete hardware components or integrated into the functionalities of hardware components, such as ASICS, FPGAs, DSPs, or similar devices. In addition, the profile-based performance tuner 428 can be implemented as firmware or functional circuitries within hardware devices. Further, the profile-based performance tuner 428 can be implemented in any combination of hardware devices and software components.

Thus, some embodiments of the profile-based performance tuning of computing systems have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
   storing a plurality of profiles in a storage device in a computing system, each of the plurality of profiles comprising a set of kernel parameters;
   generating, by a processing device, a first user interface to permit a user to enter a selection of one of the plurality of profiles or a selection which allows a user to input a user-written custom profile not available on the computing system;
   when the plurality of profiles includes a first profile desired by the user,
      receiving, by the processing device from the user, a selection of the first profile; and
      before executing an application on the computing system, tuning a kernel using the first profile by setting the kernel according to a kernel parameter of the first profile;

when the plurality of profiles does not include the first profile,
　　receiving, by the processing device from the user, a selection which allows the user to input a user-written custom profile;
　　generating, by the processing device, a second user interface to permit the user to input the user-written custom profile;
　　receiving, by the processing device via the second user interface, the user-written custom profile; and
　　before executing the application on the computing system, tuning the kernel using the user-written custom profile by setting the kernel according to a kernel parameter of the user-written custom profile; and
executing the application on the computing system.

2. The method of claim 1, further comprising executing, by the processing device, a script associated with the first profile or the user-written custom profile to tune the computing system according to the set of kernel parameters in the first profile or the user-written custom profile.

3. The method of claim 1, wherein the plurality of profiles comprise one or more of a latency profile, a throughput profile, or an application profile.

4. The method of claim 1, wherein the set of kernel parameters comprise at least one of a buffer size, a memory usage policy, or a network setup.

5. The method of claim 1, wherein the plurality of profiles are machine-specific.

6. An apparatus, comprising:
　a storage device to store a plurality of profiles in a computing system, each of the plurality of profiles comprising a set of kernel parameters; and
　a processing device operatively coupled to the storage device, the processing device operable to:
　store the plurality of profiles in the storage device in the computing system;
　generate a first user interface to permit a user to enter a selection of one of the plurality of profiles or a selection which allows a user to input a user-written custom profile not available on the computing system;
　when the plurality of profiles includes a first profile desired by the user,
　　receive, from the user, a selection of the first profile; and
　　before executing an application on the computing system, tuning a kernel using the first profile by setting the kernel according to a kernel parameter of the first profile;
　when the plurality of profiles does not include the first profile,
　　receive, from the user, a selection which allows the user to input a user-written custom profile;
　　generate a second user interface to permit the user to input the user-written custom profile;
　　receive, via the second user interface, the user-written custom profile; and
　　before executing the application on the computing system, tune the kernel using the user-written custom profile by setting the kernel according to a kernel parameter of the user-written custom profile; and
　execute the application on the computing system.

7. The apparatus of claim 6, wherein the processing device executes a script associated with the first profile or the user-written custom profile to tune the computing system according to the set of kernel parameters in the first profile or the user-written custom profile.

8. The apparatus of claim 6, wherein the plurality of profiles comprise one or more of a latency profile, a throughput profile, or an application profile.

9. The apparatus of claim 6, wherein the set of kernel parameters comprise at least one of a buffer size, a memory usage policy, or a network setup.

10. The apparatus of claim 6, wherein the plurality of profiles are machine-specific.

11. The apparatus of claim 6, further comprising a display device, wherein the processing device generates the first user interface or the second user interface, and the display device displays the first user interface or the second user interface.

12. A non-transitory computer-readable storage medium storing instructions that, when executed by a processing device, causes the processor processing device to perform operations, comprising:
　storing a plurality of profiles in a storage device in a computing system, each of the plurality of profiles comprising a set of kernel parameters;
　generating, by the processing device, a first user interface to permit a user to enter a selection of one of the plurality of profiles or a selection which allows a user to input a user-written custom profile not available on the computing system;
　when the plurality of profiles includes a first profile desired by the user,
　　receiving, by the processing device from the user, a selection of the first profile; and
　　before executing an application on the computing system, tuning a kernel using the first profile by setting the kernel according to a kernel parameter of the first profile;
　when the plurality of profiles does not include the first profile,
　　receiving, by the processing device from the user, a selection which allows the user to input a user-written custom profile;
　　generating, by the processing device, a second user interface to permit the user to input the user-written custom profile;
　　receiving, by the processing device via the second user interface, the user-written custom profile; and
　　before executing the application on the computing system, tuning the kernel using the user-written custom profile by setting the kernel according to a kernel parameter of the user-written custom profile; and
　executing the application on the computing system.

13. The non-transitory computer-readable storage medium of claim 12, further comprising executing, by the processing device, a script associated with the first profile or the user-written custom profile to tune the computing system according to the set of kernel parameters in the first profile or the user-written custom profile.

14. The non-transitory computer-readable storage medium of claim 12, wherein the plurality of profiles comprise one or more of a latency profile, a throughput profile, or an application profile.

15. The non-transitory computer-readable storage medium of claim 12, wherein the set of kernel parameters comprise at least one of a buffer size, a memory usage policy, or a network setup.

16. The non-transitory computer-readable storage medium of claim 12, wherein the plurality of profiles are machine-specific.

* * * * *